United States Patent
Guthery

(10) Patent No.: US 7,043,493 B2
(45) Date of Patent: May 9, 2006

(54) HIERARCHICAL FILE SYSTEM AND ANTI-TEARING ALGORITHM FOR A LIMITED-RESOURCE COMPUTER SUCH AS A SMART CARD

(75) Inventor: Scott B. Guthery, Newton, MA (US)

(73) Assignee: Fujitsu Limited, Kanagawa (JP)

( * ) Notice: Subject to any disclaimer, the term of this patent is extended or adjusted under 35 U.S.C. 154(b) by 440 days.

(21) Appl. No.: 10/241,746

(22) Filed: Sep. 11, 2002

(65) Prior Publication Data

US 2003/0115227 A1   Jun. 19, 2003

Related U.S. Application Data

(60) Provisional application No. 60/322,801, filed on Sep. 17, 2001.

(51) Int. Cl.
G06F 17/30 (2006.01)

(52) U.S. Cl. ............... 707/101; 707/8; 707/100; 707/103; 707/200

(58) Field of Classification Search ........ 707/100, 707/205, 200–206, 101, 8, 103; 711/159
See application file for complete search history.

(56) References Cited

U.S. PATENT DOCUMENTS

| | | | |
|---|---|---|---|
| 4,827,115 A | 5/1989 | Uchida et al. | |
| 4,877,945 A | 10/1989 | Fujisaki | |
| 5,119,291 A * | 6/1992 | Flannagan et al. | 711/4 |
| 5,363,334 A * | 11/1994 | Alexander et al. | 365/185.04 |
| 5,390,148 A | 2/1995 | Saito | |
| 5,390,318 A * | 2/1995 | Ramakrishnan et al. | 711/158 |
| 5,479,637 A | 12/1995 | Lisimaque et al. | |
| 5,532,463 A | 7/1996 | Debelleix et al. | |
| 5,715,431 A | 2/1998 | Everett et al. | |
| 5,819,292 A | 10/1998 | Hitz et al. | |
| 5,963,962 A | 10/1999 | Hitz et al. | |
| 6,122,631 A * | 9/2000 | Berbec et al. | 707/9 |
| 6,216,204 B1 | 4/2001 | Thiriet | |
| 6,289,510 B1 | 9/2001 | Nakajima | |
| 6,324,661 B1 | 11/2001 | Gerbault et al. | |
| 6,434,238 B1 | 8/2002 | Chaum et al. | |
| 6,467,025 B1 * | 10/2002 | Taylor | 711/118 |
| 6,480,935 B1 | 11/2002 | Carper et al. | |

(Continued)

FOREIGN PATENT DOCUMENTS

EP    1017028 A2    7/2000

(Continued)

Primary Examiner—Cam-Y Truong
(74) Attorney, Agent, or Firm—Gesmer Updegrove, LLP; David Jacobs

(57) ABSTRACT

A limited resource computer such as one based upon an integrated circuit card ("smart card") or embedded processor employs a full hierarchical file system consistent with desktop and laptop computers, thereby enabling the full execution of application programs. This hierarchical file system contains both files and directories and is consistent with the following limited resource computer considerations: small code size for implementation; compact representation; robust to errors due to loss of power and/or master clock signal; fast access and retrieval; and being appropriate for memory-only storage. Along with doubly linking each of the memory blocks, the present invention also includes an anti-tearing algorithm for data consistency protection in case either power or the master clock signal is removed from the limited resource computer before a write operation is complete. The anti-tearing algorithm is operative to ensure that data residing in any object of the hierarchical file system.

24 Claims, 8 Drawing Sheets

U.S. PATENT DOCUMENTS

| | | |
|---|---|---|
| 6,484,937 B1 | 11/2002 | Devaux et al. |
| 6,535,841 B1 * | 3/2003 | Meyer .................. 703/13 |
| 6,539,453 B1 | 3/2003 | Guterman |
| 2001/0007108 A1 | 7/2001 | Teich et al. |
| 2002/0184434 A1 | 12/2002 | Kawaura |
| 2002/0188886 A1 | 12/2002 | Liu et al. |
| 2003/0066894 A1 | 4/2003 | Boyer et al. |

FOREIGN PATENT DOCUMENTS

| | | |
|---|---|---|
| EP | 0920685 B1 | 11/2001 |
| EP | 0645046 B1 | 6/2002 |
| WO | W0 0199449 A1 | 12/2001 |
| WO | WO 0209046 A1 | 1/2002 |
| WO | WO 0225976 A1 | 3/2002 |
| WO | WO 0233866 A2 | 4/2002 |
| WO | WO 0250844 A3 | 6/2002 |
| WO | WO 02054195 A3 | 7/2002 |
| WO | WO 02058361 A2 | 7/2002 |
| WO | WO 03032172 A2 | 4/2003 |

* cited by examiner

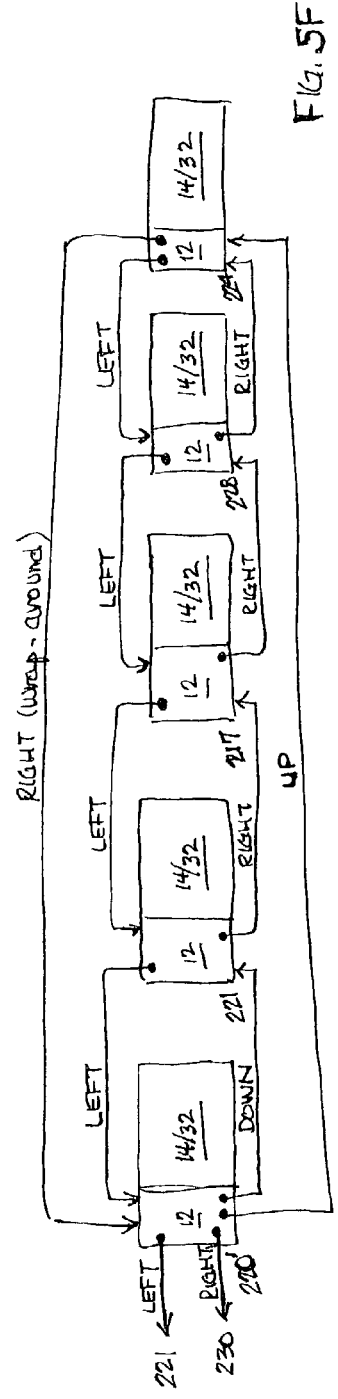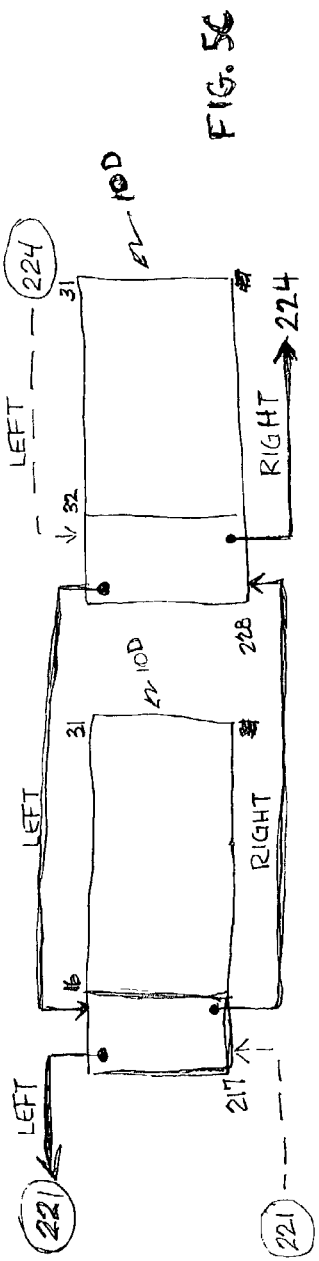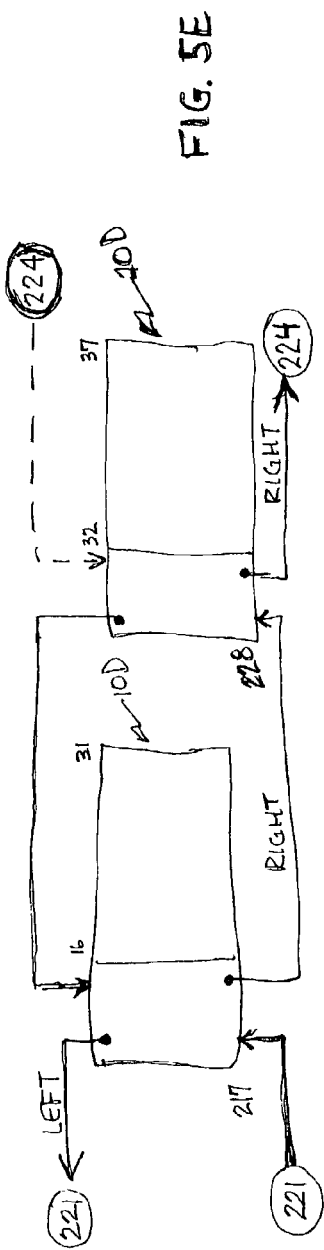

HIERARCHICAL FILE SYSTEM AND ANTI-TEARING ALGORITHM FOR A LIMITED-RESOURCE COMPUTER SUCH AS A SMART CARD

CROSS-REFERENCE TO RELATED APPLICATIONS

This application is based on and claims the priority from U.S. Provisional Patent Application Ser. No. 60/322,801, filed Sep. 17, 2001 for "File System for Limited-Resource Computers."

BACKGROUND OF THE INVENTION

1. Field of the Invention

The present invention relates in general to file systems for limited-resource computational devices and systems, and in particular, to devices, systems and methods for implementing a fast-access, memory-resident, doubly-linked hierarchical file system and anti-tearing algorithm on limited-resource digital computer systems such as smart cards and embedded processors.

2. Background

In general, smart cards are integrated circuit cards that form a part of a circuit or system when engaged with a smart card interface. The complexity of smart cards varies from being little more than a device allowing the storage and retrieval of information, to those having microprocessors and substantial memory. Their uses are numerous, including for example, communication devices such as mobile telephones, computer security devices, and financial transaction cards for use in Automated Teller Machines (ATMs) and the like.

The prior art includes a number of patents and other references generally related to information processing and integrated circuit cards. These include the following, each of which is incorporated by reference herein:

U.S. Pat. No. 6,289,510: Online Program-Updating System and Computer-Readable Recording Medium Storing a Program-Updating Program;

U.S. Pat. No. 6,212,576: Operating System Interface for use with Multitasking GSM Protocol Stacks;

U.S. Pat. No. 6,009,454: Multi-tasking Operation System for Industrial Controller;

U.S. Pat. No. 4,847,751: Multi-task Execution Control System;

U.S. Pat. No. 4,652,990: Protected Software Access Control Apparatus and Method;

WO02054195A2: Method of Controlling Access to a Data Field Held by a Smart Card;

WO0199448A1: Method for Processing and Transmitting Data on a Mobile Telephone Network and Microchip Onboard System;

WO0152575A1: Representation of Applications in a Telecommunication System;

WO0143472A1: Safe Information Interchange between a user of a Terminal and a SIM Application Toolkit via WAP.

The following patents are directed specifically to anti-tearing algorithms, which are hereby incorporated by reference:

U.S. Pat. No. 5,715,431: Tamper Proof Security Measure In Data Writing to Non-Volatile Memory;

U.S. Pat. No. 5,532,463: Process for Making Secure the Writing of Sensitive Data into EEPROM Data Storage Memory of a Memory Card and a Memory Card for Use in the Process;

U.S. Pat. No. 5,479,637: Method and Device for Updating Information Elements in a Memory;

U.S. Pat. No. 5,390,148: Method of Rewriting Data in EEPROM and EEPROM card;

U.S. Pat. No. 4,877,945: IC Card having a Function to Exclude Erroneous Recording; and U.S. Pat. No. 4,827,115: ID System and Method of Writing Data in an ID System.

Smart cards and so-called embedded processors are a subset of limited-resource computers. Rather than being designed to perform a single, fixed function throughout their lifetimes, these limited-resource computers and the system software on them are being designed to accept and run application programs. See, for example, previously cited U.S. Pat. No. 6,289,510, issued Sep. 11, 2001, which is assigned to Fujitsu Limited of Kawasaki, Japan. Concomitantly, the operating systems on these computers are increasingly similar to miniature versions of the operating systems on laptop and desktop computers.

In larger computers such as laptops and desktops, a hierarchical file system containing data files and directories ("folders") is an integral part of the native operating system. However, conventional data storage schemes in small, limited-resource computers have heretofore been only marginally like the full-fledged hierarchical file systems of desktop and laptop computers. In many cases, these schemes provide only linked blocks of memory in which to store data, or, where primitive file system semantics are provided, significant constraints and restrictions unfamiliar to programmers of laptop and desktop operating systems burden them.

In order to ease the creation of applications for these limited-resource computers and facilitate the movement of applications from laptop and desktop computers, it is desirable to implement a full-fledged hierarchical file system on these limited-resource devices, taking into account, of course, their special properties and usage profiles.

In particular, a limited-resource computer file system should balance the following requirements: complete hierarchical file system semantics; small code size for implementation; compact representation; robust to occasional errors; fast access and retrieval; and appropriate for memory-only storage.

Accordingly, it is desirable to provide systems, devices and methods that meet these requirements and are appropriate for limited resource computers.

SUMMARY OF THE INVENTION

In view of the aforementioned problems and shortcomings of the prior art, the present invention provides file system organizations and implementations appropriate for small processors and memory-only storage. The file system organizations and implementations support complete hierarchical file system semantics and enable compact representations, small code size for implementation, fast access and retrieval, and relative immunity to occasional errors.

The exemplary file system structure described herein is doubly linked and provides a number of advantages, including supporting a highly efficient anti-tearing algorithm that ensures that data in a smart card or similar processor utilizing the file system remains consistent, even if the cardholder removes power and clock from the card at any arbitrary moment (referred to as "tearing" of the card out of the card reader).

Further, the present invention provides, in a limited resource computer, a novel file method. The method at least includes the steps of providing a plurality of memory blocks, and in response to the computer executing application programs, designating memory blocks according to a hierarchy, the hierarchy at least including files and directories.

Also, the present invention provides, in a limited resource computer, a novel file system. The file system at least includes a plurality of memory blocks, and a memory block designator adapted to, in response to the computer executing application programs, designating memory blocks according to a hierarchy, the hierarchy at least including files and directories.

BRIEF DESCRIPTION OF THE DRAWINGS

A more complete understanding of the present invention and the attendant advantages and features thereof may be had by reference to the following detailed description of the invention when considered in conjunction with the accompanying drawings wherein:

FIG. 5C illustrates another step implemented by the first set of instructions of the anti-tearing algorithm wherein additional pointers of the allocated data memory blocks depicted in FIG. 5B in conjunction with a write operation with respect to the data-protected file of FIG. 5A are set.

FIG. 5E illustrates another step implemented by the first set of instructions of the anti-tearing algorithm wherein one further pointer of one of the allocated data memory blocks depicted in FIG. 5B in conjunction with a write operation with respect to the data-protected file of FIG. 5A is set.

FIG. 5F illustrates the data-protected file of FIG. 5A after the completion of the write operation conducted with respect thereto by means of the first set of instructions of the anti-tearing algorithm.

DETAILED DESCRIPTION OF THE INVENTION

1. EXEMPLARY SMART CARD SYSTEM

Figure 1:
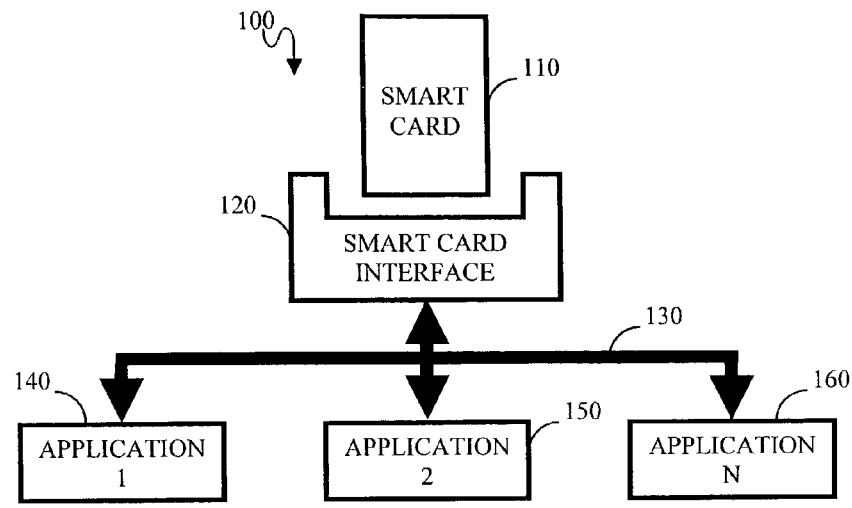
FIG. 1 is a block diagram illustrating a limited-resource computer system such as a smart card system.

Referring now to the drawings wherein like reference numerals identify corresponding or similar elements throughout the several views, FIG. 1 depicts a smart card system 100 that exemplifies a limited-resource computer system. This smart card system 100 includes a smart card 110, a smart card interface 120, a communication link 130, and several application sources 140, 150, 160 running applications utilizing the resources of the smart card 110 for execution. The conventional layout and elements (e.g., memory, microprocessor, I/O circuits) and functionality of smart cards such as that illustrated in FIG. 1 are well known to those skilled in the art. For example, WO 02/054195 A2, entitled Method of Controlling Access to a Data File Held by a Smart Card, describes one representative embodiment of a smart card. In accordance with the present invention, the smart card 110 can be utilized to implement the hierarchical file system according to the present invention and the processes associated with this hierarchical file system as described below (write and recovery operations by means of an anti-tearing algorithm), as well as the fixed routines generally associated with prior art smart cards.

2. BASIC FILE SYSTEM ARCHITECTURE

Figure 2:
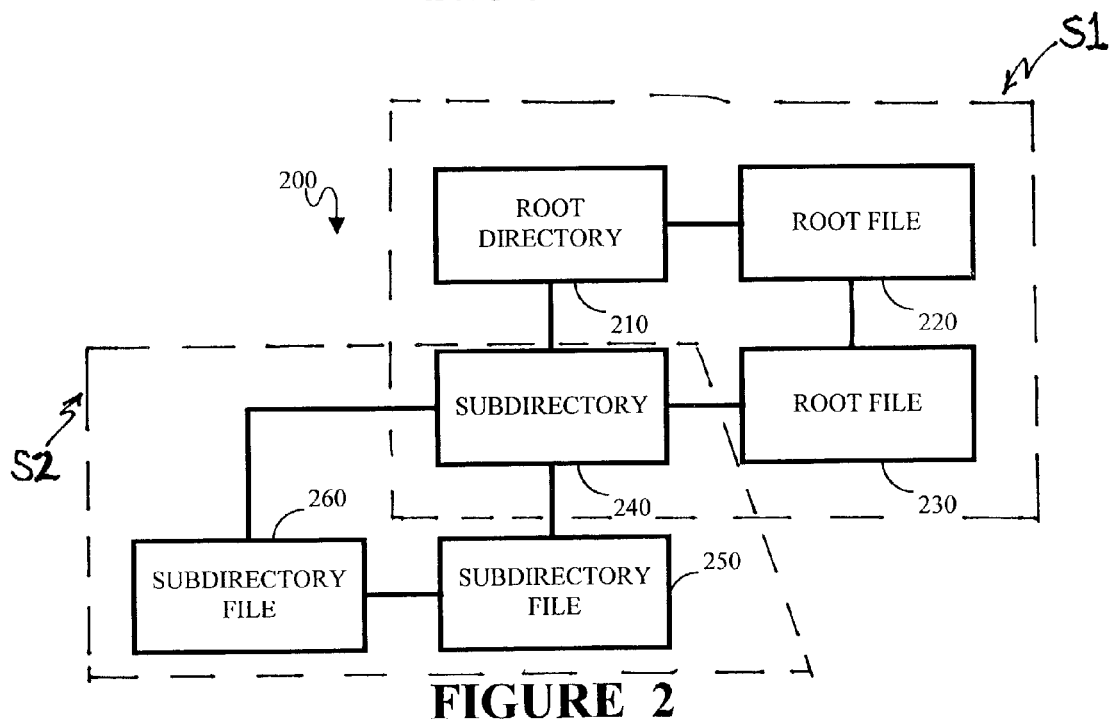
FIG. 2 is a block diagram illustrating the basic architecture of a hierarchical file system according to the present invention for use in a limited-resource computer system such as that illustrated in FIG. 1.

Two 'objects' are fundamental to the realization of a hierarchical file system according to the present invention: files and directories. Each file and/or directory comprising the hierarchical file system according to the present invention, in turn, is composed of one or more memory blocks as described in the following section. FIG. 2 illustrates a representative embodiment of a hierarchical file system 200 in accordance with the present invention. This hierarchical file system 200 comprises a root directory 200 containing two files, a first root file 220 and a second root file 230, and one subdirectory 240. Subdirectory 240, in turn, includes two files, a first subdirectory file 250 and a second subdirectory file 260. FIG. 2 also illustrates the double linking between the members comprising the hierarchical file system 200. In particular, root directory 200, the first and second root files 220, 230, and the subdirectory 240 comprise the members of a first double-linked set S1 wherein each member of the set S1 is double-linked to two other members of the set S1. The subdirectory 240 and the first and second subdirectory files 250, 260 comprise the members of a second double-linked set S2 wherein each member of the set S2 is double-linked to two other members of the set S2. The double-linking between members of the first and second double-linked sets S1, S2 and between the first and second double-linked sets S1 and S2 is described below in further detail. One skilled in the art will appreciate that the hierarchical file system 200 described and illustrated herein is by way of example only, and that a hierarchical file system according to the present invention can comprise various different combinations of files and directories (including subdirectories) disposed in one or more double-linked sets.

3. MEMORY BLOCK STRUCTURE

The hierarchical file system 200 according to the present invention comprises files, directories (or folders) and the like (collectively "objects") in a manner similar to the file systems embodied in conventional desktop computer systems. The basic component of each object (files and directories/subdirectories) comprising the hierarchical file system 200 according to the present invention is a memory block 10, as exemplarily illustrated in FIG. 3. The memory of a limited-resource computer such as a smart card 110 is structured so that it comprises N equally-sized memory blocks 10 where N is an integer. The N memory blocks 10 comprising the memory of the limited resource computer 110 are indexed so that each memory block 10 is uniquely identified by means of its index, e.g., each memory block 10 is uniquely identified by a specific integer. For purposes of the present discussion, indexing of memory blocks 10 is presumed to be sequential from 1 to N. One skilled in the art will appreciate, however, that the memory blocks 10 according to the present invention can be identified by indexing schemes other than sequential indexing.

Figure 4A:
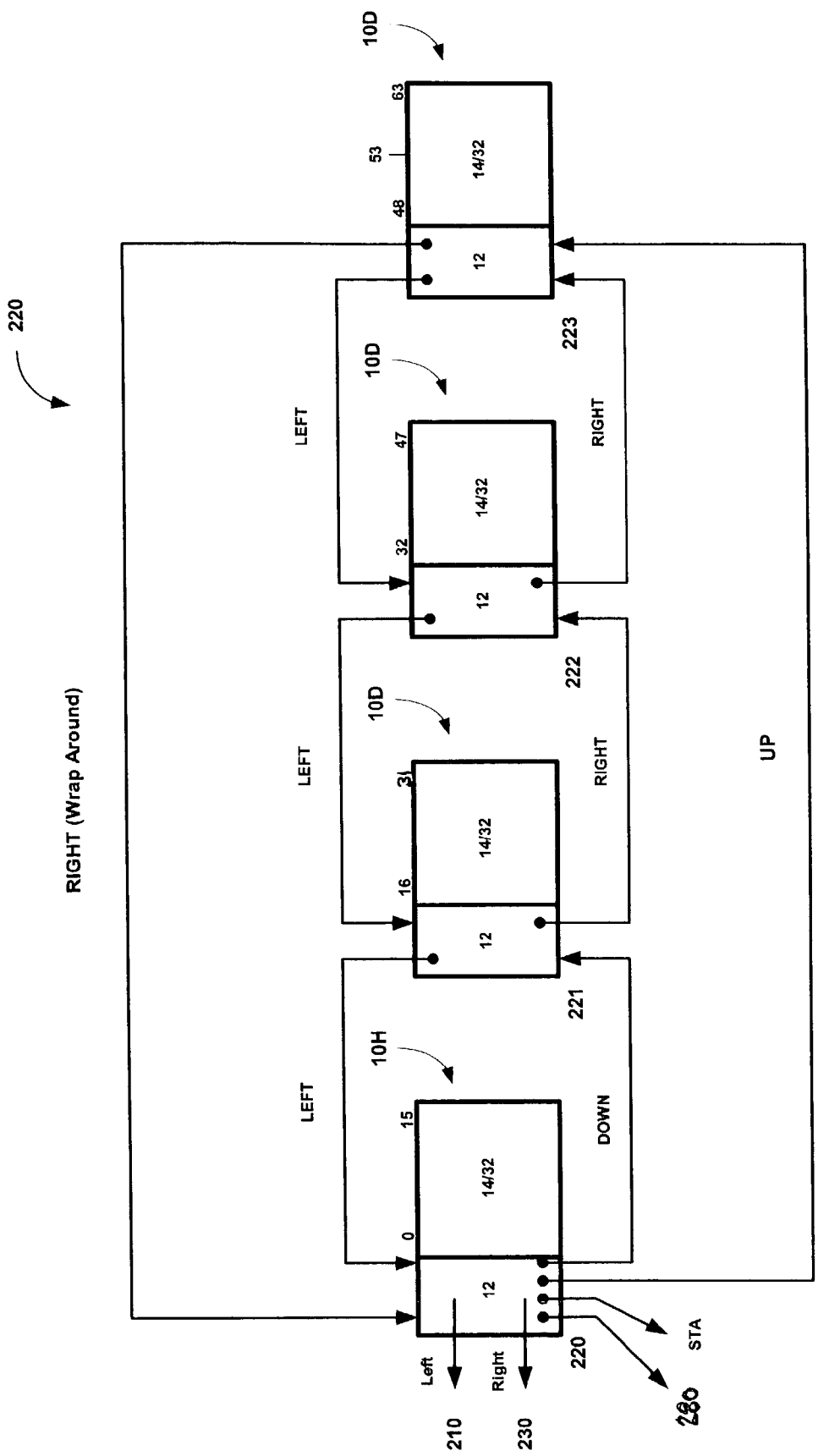
FIG. 4A illustrates an exemplary embodiment of a file of the hierarchical file system according to the present invention that comprises four (4) memory blocks, i.e., a header memory block and three (3) data memory blocks.

Each object (file or directory/subdirectory) comprising the hierarchical file system 200 according to the present invention comprises one or more memory blocks 10. Each such object will always include a single "header" memory block 10H, which is the first memory block 10 of the object. Each object comprising the hierarchical file system 200 according to the present invention is uniquely identified by the index of its header memory block H, i.e., this index not only identifies the header memory block H of the object, but also the object itself. For objects comprising more than one memory block 10, the additional memory blocks 10 are characterized as "data" memory blocks 10D. See FIG. 4A and accompanying discussion below.

Each memory block 10 (whether a header memory block 10H or a data memory block 10D) includes a header segment 12 and a data segment 14. The header segment 14 of the embodiment of the memory block 10 exemplarily illustrated in FIG. 3 comprises eight (8) fields 16–30 and one contiguous data field 32 (for the illustrated embodiment the data segment 14 and the data field 32 are identical). For the exemplary embodiment described herein, each header field 16–30 is two (2) bytes in length and the data field 32 is sixteen (16) bytes in length. Thus, each of the N memory blocks 10 of the described embodiment is thirty-two (32) bytes in length. In other embodiments of the memory block according to the present invention the header fields can have lengths other than two (2) bytes. For example, each header field could be four (4) bytes in length and the data field could be sixty-four (64) bytes in length, i.e., each of the N memory blocks 10 would be ninety-six (96) bytes in length.

Figure 3:
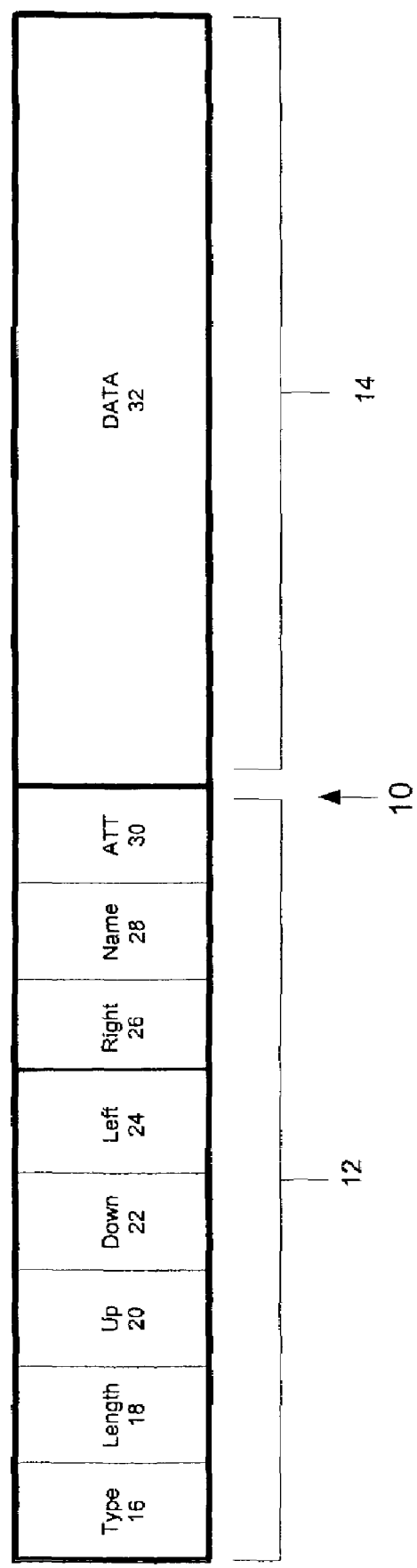
FIG. 3 illustrates an exemplary embodiment of a memory block of the hierarchical file system according to the present invention.

For the embodiment of FIG. 3, the eight (8) header fields are identified as follows:

Header field 16 identifies the generic "Type" of any particular memory block 10 comprising an object. The "Type" field of the header memory block 10H contains a bit pattern that identifies the header memory block 10H in terms of the object of which it is a member. Examples of object "types" include 'file', 'directory', 'data', and 'string'.

Header field 18 of the header memory block 10H identifies the "Length" of the object of which it is a member. The "length" field contains a number that represents the total number of bytes of the object. For example, for a file object the "Length" filed indicates the total number of data bytes stored in the file.

Header field 20 contains an "Up" index, which is either: (1) an integer from 1 to N for the header memory block 10H of any object; or (2) equal to zero (0). A non-zero index contained in the "Up" field of the header memory block 10H points to the last additional data memory block 10D comprising the object. A short-hand functional notation to describe this particular feature of the invention is "Up(B)", which refers to the index stored in the "Up" field of the specific memory block (B)—"B" itself being an index that uniquely defines a specific memory block 10.

Header field 22 contains a "Down" index, which is either: (1) an integer from 1 to N for the header memory block 10H of any object; or (2) equal to zero (0). A non-zero index contained in the "Down" field of header memory block 10H points to the first additional data memory block 10D comprising the object. A short-hand functional notation to describe this particular feature of the invention is "Down(B)", which refers to the index stored in the "Down" field of the specific memory block (B)—"B" itself being an index that uniquely defines a specific memory block 10.

Header field 24 contains a "Left" index, which is either: (1) an integer from 1 to N for the header memory block 10H of any object; or (2) equal to zero (0). A non-zero index contained in the "Left" field of the header memory block 10H points to the previous object in the double-linked set of which it is a member. A short-hand functional notation to describe this particular feature of the invention is "Left(B)", which refers to the index stored in the "Left" field of the specific memory block (B)—"B" itself being an index that uniquely defines a specific memory block 10.

Header field 26 contains a "Right" index, which is either: (1) an integer from 1 to N for the header memory block 10H of any object; or (2) equal to zero (0). A non-zero index contained in the "Right" field of the header memory block 10H points to the next object in the double-linked set of which it is a member. A short-hand functional notation to describe this particular feature of the invention is "Right(B)", which refers to the index stored in the "Right" field of the specific memory block (B)—"B" itself being an index that uniquely defines a specific memory block 10.

Header field 28 contains a "Name" index, which is either: (1) an integer from 1 to N for the header memory block 10H; or (2) equal to zero (0). A non-zero index contained in the "Name" field of the header memory block 10H points to the header memory block of an object of type 'string' that has a sequence of bytes, e.g., alphanumeric characters, in its data field(s) that comprises the 'name' of the object that points to it.

Header field 30 contains an "Attribute" index, which is either: (1) an integer from 1 to N for a header memory block 10H; or (2) equal to zero (0). A non-zero index contained in the "Attribute" field points to the header memory block that has a sequence of bytes in its data field(s) that defines the particulars of the object, e.g., where the object is of type "file", the bytes identify whether it is a read-only or read-write file, etc.

The foregoing descriptions of the various fields comprising the header segment 12 will be better understood by referring to the description set forth with respect to the structure of an exemplary file of the hierarchical file system 10 according to the present invention.

4. FILE STRUCTURE

FIG. 4 illustrates an exemplary embodiment of the basic structure of a file of the hierarchical file system 200 according to the present invention that comprises a set of doubly-linked memory blocks 10, i.e., a header memory block 10H and three data memory blocks 10D for the illustrated embodiment, as described in the preceding paragraphs. To facilitate a better understanding of the interrelationships of the memory blocks 10H, 10D and the constituent fields of the memory blocks 10 comprising this file, this file is identified as the root file 220 of FIG. 2. As mentioned above, one particular aspect of the present invention is that any object, i.e., root file 220, is identified by the index of its header memory block 10H. Accordingly, the header memory block 10H of FIG. 4 is uniquely identified by the reference numeral "220", which in turn, uniquely identifies the root file 220.

As discussed above, each memory block 10 is uniquely identified by an index that is an integer. For convenience of the following discussion, the three data memory blocks 10D comprising the root file 220 are identified by the sequential indexes 221, 222, and 223, respectively. One skilled in the art will appreciate that the individual memory blocks 10H, 10D that comprise a set of doubly-linked memory blocks 10 that constitute an object such as a file of the hierarchical file system 200 according to the present invention are not necessarily sequentially indexed as in this illustrative example. In point of fact, a set of doubly-linked memory blocks 10 comprising an object such as a file is just as likely to be non-sequentially indexed, e.g., a set consisting of memory blocks 10 identified non-sequentially by the indexes 4, 7, and 13 (where the index 4 identifies the header memory block 10H and the file itself while the indexes 7 and 13 identify the first and second data memory blocks 10D linked to the header memory block 10H).

With respect to the header memory block 10H identified by reference numeral "220", the "Type" field of this header memory block 10H (index=220) would contain a bit pattern that would identify root file 220 as a file. The "Length" field of this header memory block 10H (index=220) would be a bit pattern indicating that the length of the root file 220 is fifty-three (53) bytes, i.e., sixteen (16) bytes in the "Data" fields of the header memory block 10H and the first and second data memory blocks 10D (indexes 221, 222 ), respectively, and five (5) bytes in the last data memory block 10D (index 223 ) (the last data memory block 10D is not fully populated with data—eleven (11) bytes do not contain data). The "Name" field of this header memory block 10H (index=220) would contain an integer that is the index of the header memory block 11H of an object of the type "string" (index=280), as exemplarily illustrated in FIG. 4B, that is stored in the persistent memory of a limited-resource computer 110 such as a smart card.

Figure 4B:
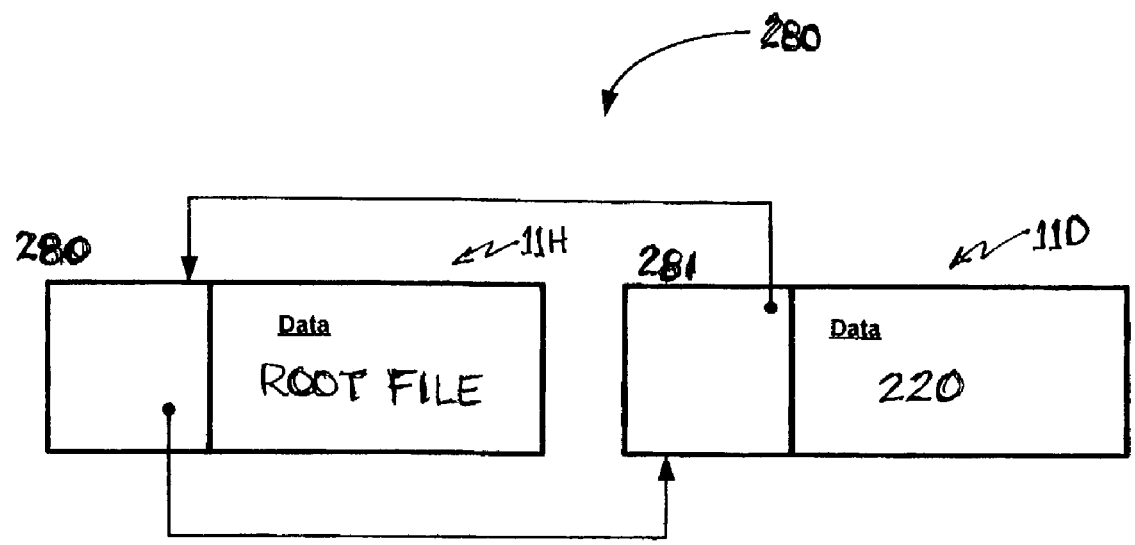
FIG. 4B illustrates an exemplary embodiment of a string object for use in conjunction with the hierarchical file system of the present invention.

The header memory block 11H of the type "string" exemplarily illustrated in FIG. 4B includes at least one memory block having a header segment 11H and a data segment 11D. The header segment 11H includes a "Type" field that identifies the object as a "string" object. The index of header memory block 11H, i.e., 280, is an integer that uniquely identifies the first memory block of the "string" object and the string itself. The data stored in the data segments of the memory blocks 11H, 11D comprise a sequence of characters that defines the 'name' of the file. To the extent that multiple memory blocks are required to completely hold the 'name' of the file, additional memory blocks can be added as required to completely define the 'name' of the file. The data segment of header memory block 11H contains eight characters "ROOTFILE" and the data segment of additional data memory block 11D (index=281) contains the characters "220" in the example illustrated in FIG. 4B. The "Length" field of the header memory block 11H would contain the integer value eleven (11) indicating there are eleven (11) characters in the file name string object. In a similar manner, the "Attributes" field of the header memory block 10H (index=220) contains an integer that is the index of the header memory block of an object of type "attribute" (see arrow STA in FIG. 4A) that defines the characteristics of the object (for the described example, root file 220 ) of which the header memory block 10H is a member.

Double Linking Between Memory Blocks Comprising a File

Header memory block 10H (index=220): The "Up" field contains a bit pattern for the index=223, i.e., the "Up" field points to the last data memory block 10D comprising the root file 220. The "Down" field contains a bit pattern for the index=221, i.e., the "Down" field points to the first data memory block 10D, identified by index=221, comprising the root file 220. The "Left" field contains a bit pattern for the index=210, i.e., the "Left" field points to the previous object (root directory 210 ) of the double-linked set S1 of which root file 220 is a member (see FIG. 2 and accompanying discussion above). The "Right" field contains a bit pattern for the index=230, i.e., the "Right" field points to the next object (root file 230 ) of the double-linked set S1 of which root file 220 is a member (see FIG. 2 and accompanying discussion above).

First data memory block 10D (index=221): The "Up" and "Down" fields contain a bit pattern for zero (0). The "Left" field contains a bit pattern for the index=220, i.e., the "Left" field points to the previous memory block, which is the header memory block 10H of the root file 220 uniquely identified by index=220. The "Right" field contains a bit pattern for the index=222, i.e., the "Right" field points to the next memory block of the root file 220, i.e., the data memory block 10D uniquely identified by index=222.

Second data memory block 10D (index=222): The "Up" and "Down" fields contain a bit pattern for zero (0). The "Left" field contains a bit pattern for the index=221, i.e., the "Left" field points to the previous memory block, which is the first data memory block 10D of the root file 220 uniquely identified by index=221. The "Right" field contains a bit pattern for the index=223, i.e., the "Right" field points to the next memory block of the root file 220, i.e., the data memory block 10D uniquely identified by index=223.

Last data memory block 10D (index=223): The "Up" and "Down" fields contain a bit pattern for zero (0). The "Left" field contains a bit pattern for the index=222, i.e., the "Left" field points to the previous memory block, which is the second data memory block 10D of the root file 220 uniquely identified by the index=222. The "Right" field contains a bit pattern for the index=220, i.e., the "Right" field points to the next memory block of the root file 220, i.e., the header memory block 10H uniquely identified by index=220, which, concomitantly, identifies the root file 220 itself. As discussed above, the "Right" field pointer of the last data memory block 10D 'wraps around' to point to the header memory block 10H of the object of which it is a member.

As should be evident from the foregoing discussion, each memory block comprising an object such as the root file 220 is doubly-linked to two other memory blocks of the object. Each such memory block is "forward" linked to one memory block and is "backward" linked to a different memory block. Table I illustrates this double-linking of memory blocks in the context of the root file 220 illustrated in FIG. 4A, as described in the preceding paragraphs.

TABLE I

DOUBLE LINK STRUCTURE OF A DATA FILE

| MEMORY BLOCK | "RIGHT" FIELD/ FORWARD LINK | "LEFT" FIELD/ BACKWARD LINK |
|---|---|---|
| 220 | 221 | 223 |
| 221 | 222 | 220 |
| 222 | 223 | 221 |
| 223 | 220 | 222 |

5. DIRECTORY/SUBDIRECTORY STRUCTURE

The basic structure of any directory of the hierarchical file system 200 according to the present invention is the memory block 10 described above, as exemplarily illustrated in FIG. 3. Each directory, however, consists of only a single memory block 10, which would be analogous to the header memory block 10H discussed above in connection with the file structure, with the following exception. The data segment 14/data field 32 of the header memory block 10H of any directory is empty.

The header segment 12 of the header memory block 10H of any directory would include fields such as those described in connection with FIG. 3. The "Type" field of the header memory block 10H of any directory contains a bit pattern that identifies the header memory block 10H as the first memory block in an object of type "directory". The "Length" field of the header memory block 10H contains a bit pattern for zero (0). The "name" and "attributes" fields contain bit patterns for the indexes that point to the "string" and "attributes" objects, respectively, that include information of the ilk described above in connection with these fields in the header memory block 10H of the file structure.

The "Up" field of the header memory block 10H of any directory contains a bit pattern representing an index that identifies or points to the last file or directory in the double-linked set of header memory blocks that are the first memory blocks of the files and directories that are, in turn, contained in the directory. A short-hand functional notation to describe this particular feature of the invention is "Up (Dir)", which refers to the index stored in the "Up" field of the header memory block (Dir)—"Dir" itself being an index that uniquely defines the specific directory.

The "Down" field of the header memory block 10H of any directory contains a bit pattern representing an index that identifies or points to the first file or directory in the double-linked set of header memory blocks that are the first memory blocks of the files and directories that are, in turn, contained in the directory. A short-hand functional notation to describe this particular feature of the invention is "Down (Dir)", which refers to the index stored in the "Down" field of the header memory block (Dir)—"Dir" itself being an index that uniquely defines the specific directory.

In the special case that a directory contains no files or directories, i.e., the directory is empty, the both the "Down" field and the "Up" field both contain the index of the header memory block of the directory itself.

The "Left" field of the header memory block 10H of any directory contains a bit pattern representing an index that identifies or points to the previous file or directory of the double-linked set of header memory blocks that are the first memory blocks of the files and directories contained in the same directory as the directory. A short-hand functional notation to describe this particular feature of the invention is "Left(Dir)", which refers to the index stored in the "Left" field of the header memory block (Dir)—"Dir" itself being an index that uniquely defines the specific directory.

The "Right" field of the header memory block 10H of any directory contains a bit pattern representing an index that identifies or points to the next file or directory of the double-linked set of header memory blocks that are the first memory blocks of the files and directories that are contained in the same directory as the directory. A short-hand functional notation to describe this particular feature of the invention is "Right(Dir)", which refers to the index stored in the "Right" field of the header memory block (Dir)—"Dir" itself being an index that uniquely defines the specific directory.

In the special case that the directory is not contained in another directory, then both the "Left" field and the "Right" field contain the index of the header memory block of the directory itself. There is exactly one such directory in every hierarchical file system, and it is typically called the "Root" directory and thus the root of the file system.

Table II illustrates the double linking that is characteristic of the hierarchical file system according to the present invention, in the context of the exemplary hierarchical file system 200 depicted in FIG. 2.

TABLE II

| BLOCK | TYPE | UP | DOWN | LEFT | RIGHT | Comment |
|---|---|---|---|---|---|---|
| 1(210) | Directory | 4 | 2 | 1 | 1 | Root directory. |
| 2(220) | File | 0 | 0 | 1 | 3 | First file in the root directory. |
| 3(230) | File | 0 | 0 | 2 | 4 | Second file in the root directory. |
| 4(240) | Directory | 6 | 5 | 3 | 1 | Subdirectory in the root directory. |
| 5(250) | File | 0 | 0 | 4 | 6 | First file in the subdirectory. |
| 6(260) | File | 0 | 0 | 5 | 4 | Second file in the subdirectory |

The double linked hierarchical file system according to the present invention, as described above, provides a number of advantages, including supporting a highly efficient anti-tearing algorithm that insures that the data in the files and the structure of the file hierarchy remain consistent even if power and clock are removed from the smart card processor at any arbitrary moment (i.e., characterized as "tearing" the smart card out of the smart card reader). Consistency in this context means that file contents and file hierarchy structure are guaranteed to be in the state they were before any change began or in the state they were to be in after any change is completed. In other words, all changes to the file contents and file hierarchy structure are "all or nothing" or "atomic".

One skilled in the art will have observed that data memory blocks in a file bear the same relationship to the header memory block of the file as the header memory blocks of the files and directories in a directory bear to the header memory block of the directory. The anti-tearing algorithm of the present invention is described in the following paragraphs relative to the more frequent case of changing the data contents of a file. The exact same algorithm can be utilized to change the contents of a directory.

6. ANTI-TEARING ALGORITHM—ROUTINE WRITE OPERATION

The anti-tearing algorithm for the hierarchical file system according to the present invention includes two sets of instructions: (1) a first set of instructions that is executed when the anti-tearing algorithm is implemented to perform a routine write operation with is respect to selected files of the hierarchical file system according to the present invention; and (2) a second set of instructions that is executed with respect to such selected files whenever a limited-resource computer system 110 such as a smart card is powered-up, reinitialized, or reset, i.e., as part of the "boot" or initialization procedures of its operating system.

Data consistency protection is a significant advantageous feature of the double-linked hierarchical file system according to the present invention. All "write" operations implemented with respect to a limited-resource computer system 110 such as a smart card embodying the hierarchical file system according to the present invention are "atomic." Atomic operations, by definition, are indivisible, and are either: (1) fully executed; or (2) not executed. Therefore, when the first set of instructions is executed by the anti-tearing algorithm o implement a routine "write" operation with respect to an object such as a file of the double-linked hierarchical file system according to the present invention and this write operation is interrupted (e.g., by "tearing"), the second set of instructions of the anti-tearing (or data consistency) algorithm is operative to detect that the write operation was interrupted before it was completed. The second set of instructions of the anti-tearing algorithm, which is executed when the smart card is next used, is operative in this circumstance to ensure that data residing in such file will either be: (1) in the state it was in before the write operation (i.e., the "write" operation was not executed); or (2) in the state it will be in after completion of the "write" operation (i.e., the "writen" operation was fully executed), regardless of which instant during the "write" operation that power and/or clock was removed from the limited-resource computer system 110, i.e., tearing occurred.

To conserve the resources of a limited-resource computer system such as a smart card 110, not all of the files in the hierarchical file system according to the present invention may be subject to data consistency protection. For the files comprising the doubly-linked hierarchical file system according to the present invention, data consistency protection is a property of a file that is established when the file is created. Therefore only the files that have been identified as needing data consistency protection are subject to the processing overhead associated with the anti-tearing (or data consistency) algorithm. Any such file is identified at the time it is established as a "data-protected" file (the 'selected' files referenced above).

Data-protected files according to the present invention have a file structure similar to the exemplary root file 220 described above in connection with FIG. 4A except that any data-protected file does not contain data in the data segment 14/data field 32 of its header memory block 10H. There are two 'special' status bits associated with every data-protected file: a "read-direction" ("RD") status bit; and a "write-in-progress" ("WIP") status bit. The RD and WIP status bits can be stored in the same byte anywhere in persistent memory of a limited-resource computer 110 such a smart card, but for the embodiment described below, the RD and WIP status bits are stored in a byte in the data segment 14/data field 32 of the header memory block 10H of the data-protected file.

Figure 5A:
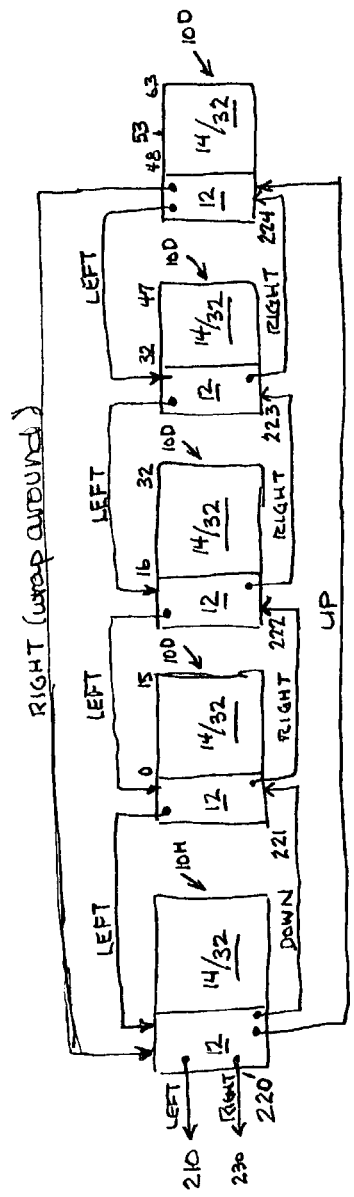
FIG. 5A illustrates the exemplary embodiment of the file of FIG. 4A reconfigured as a "data-protected" file according to the present invention.

To faciliate a more complete understanding of the normal operation of the anti-tearing (or data consistency) algorithm employed in conjunction with the hierarchical file system according to the present invention as described below, the exemplary root file 220 described above (in conjunction with FIG. 4A) is reconfigured as a "data-protected" file 220' as illustrated in FIG. 5A. Since the data segment 14/data field 32 of the header memory block 220' does not include any data, the data bytes stored in the reconfigured file 220' are right-shifted to the data segment 14/data field 32 of the next adjacent one memory block 10 (as discussed above, the root file 220 of FIG. 4A contained fifty-three (53) bytes of data: sixteen (16) data bytes in the data segment 14/data field 32 of the header memory block 10H (index=220) plus sixteen (16) data bytes in the data segment 14/data field 32 of the first data memory block 10D (index=221) plus sixteen (16) data bytes in the data segment 14/data field 32 of the second data memory block 10D (index=222) plus five (5) data bytes in the data segment 14/data field 32 of the last data memory block 10D (index=223)), and a new data memory block 10D is added to contain the last five (5) bytes of data of the file 220' (the last data memory block 10D is identified by the index=224in FIG. 5A). Reconfiguration of the root file 220 illustrated in FIG. 4 to the root file 220' also entails adjustments in the linking between the memory blocks 10 comprising this file. To wit, Up(220')=224, and Right(223)= 224, and the addition of the "Left" and "Right" fields for the last data memory block 10D identified by the index=224, i.e., Left(224)=223and Right(224)=220'.

As, noted above, the data segment 14/data field 32 of the header memory block 10H of the file 220' includes a byte that contains the RD bit and the WIP bit. The RD bit indicates which of the link lists associated with the file 220', the forward link list or the backward link list, should be used in reading the file 220' to ensure data consistency. If the RD bit is not set, i.e., equals zero (0), then the forward link list is used to read the file. If the RD bit is set, i.e., equals one (1), then the backward link list is used to read the file. Table III illustrates the double-linking of memory blocks 10 for the reconfigured root file 220' illustrated in FIG. 5A.

TABLE III

DOUBLE LINK STRUCTURE DURING DATA CONSISTENCY UPDATE

| MEMORY BLOCK | FORWARD LINK | Backward Link |
| --- | --- | --- |
| 220' | 221 | 224 |
| 221 | 222 | 220' |
| 222 | 223 | 221 |
| 223 | 224 | 222 |
| 224 | 220' | 223 |

The WIP bit indicates whether a write operation is in progress on the root file 220'. Only one write operation can be in progress at any given time. Therefore, if the WIP bit is set, a new write operation cannot be commenced. The new write operation may be queued for execution upon completion of the current write operation, or an error indication may be returned to the program that initiated the new write operation.

The normal state of the RD and WIP bits for any data-protected file is the unset state, i.e., RD=0 and WIP=0 .

Figure 6:
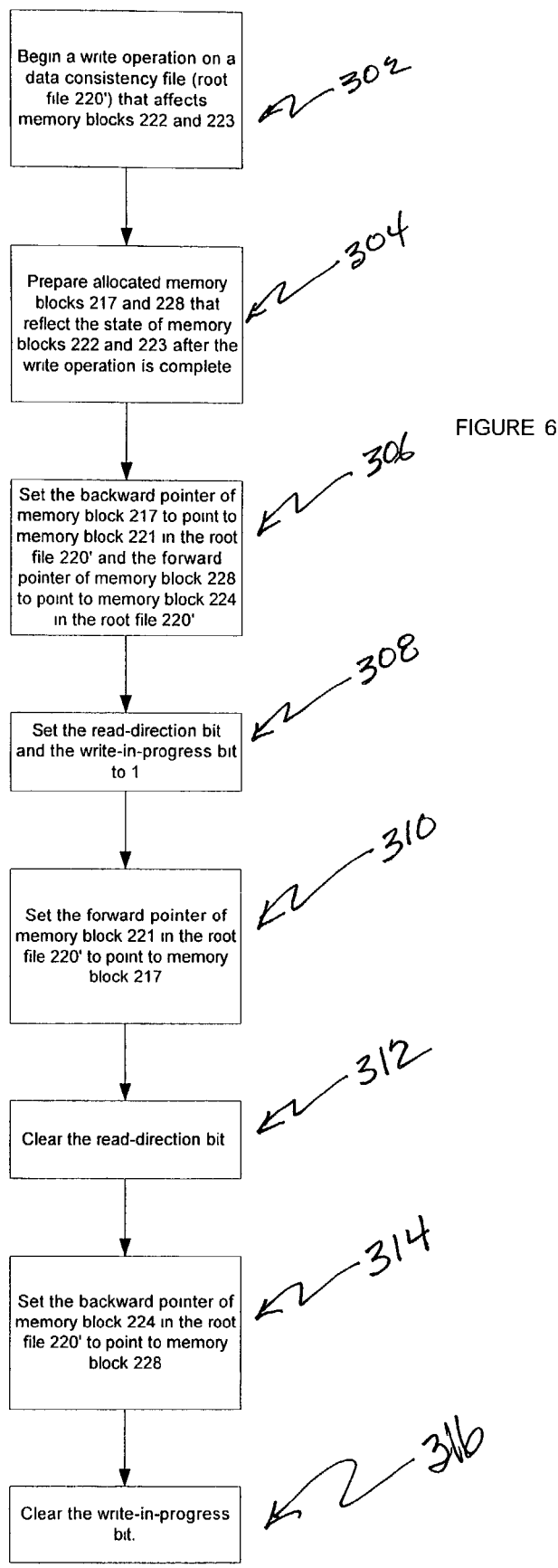
FIG. 6 is a flowchart depicting the implementation of a write operation by means of the first set of instructions of the anti-tearing algorithm of the present invention with respect to a file of the hierarchical file system according to the present invention.

The flowchart depicted in FIG. 6 exemplarily depicts one embodiment illustrating the execution of the first set of instructions of the anti-tearing algorithm according to the present invention (identified as reference numeral 300). This first set of instructions of the anti-tearing algorithm 300 implements a write operation with respect to an object (e.g., file) of the hierarchical file system according to the present invention, while concomitantly ensuring the consistency or integrity of the data embodied in this file during each and every step of the write operation.

The exemplary method 300 is discussed in the following paragraphs in the context of a write operation with respect to the root file 220' described above and illustrated in FIG. 5A. The task of this write operation is to write data to bytes twenty (20) to forty (40) of the root file 220', i.e., this write operation will 'overwrite' the data currently stored in bytes twenty (20) to forty (40) with new data. With reference to FIG. 5A, this write operation is directed to the data segments 14/data fields 32 of the second and third data memory blocks 10D (indexes=222, 223) comprising the root file 221'. Accordingly, in step 302 this write operation is begun on "data-protected" root file 220' that affects the data memory blocks 10D thereof identified by the indexes 222 and 223, respectively.

Figure 5B:
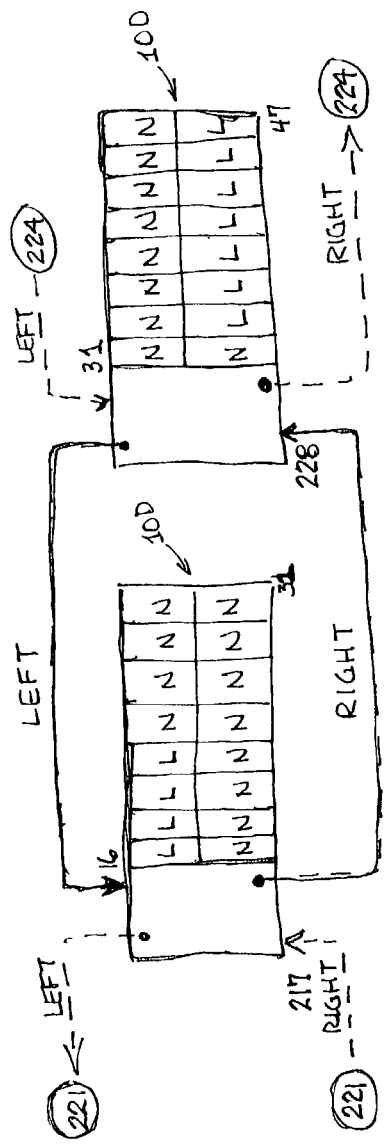
FIG. 5B illustrates one step implemented by the first set of instructions of the anti-tearing algorithm in the preparation of allocated data memory blocks in conjunction with a write operation with respect to the data-protected file of FIG. 5A.
Figure 5D:
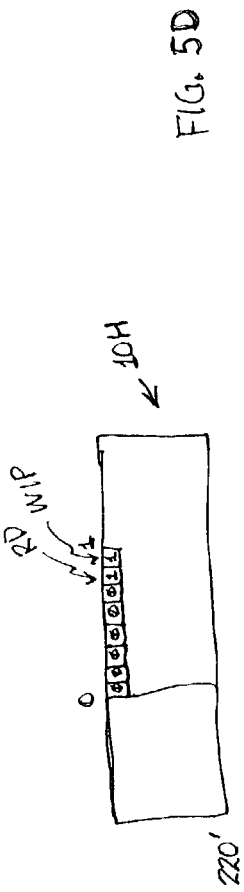
FIG. 5D exemplarily illustrates the disposition of the read-direction and write in progress status bits of the header memory block of the data-protected file of FIG. 5A during one step of the method for conducting a write operation with respect thereto.

In step 304, the first set of instructions of the anti-tearing algorithm is executed to allocate two 'new' data memory blocks 10D to contain the results of this write operation ('new' being used in the context that no relevant data is contained in the header segment and data segment of these allocated memory blocks 10D). For the purposes of this discussion, it is assumed that the two allocated data memory blocks 10D are identified by indexes 217 and 228, respectively (see discussion above regarding indexes). These first and second allocated data memory blocks 10D (indexes=217, 228) are illustrated in FIG. 5B. These two allocated data memory blocks 10D (indexes=217, 228) will replace the second and third data memory blocks 10D (indexes=222, 223) of the root file 220' once the write operation is fully executed. In a substep of step 304, the first allocated data memory block 10D identified by index=217 is forward linked to the second allocated data memory block 10D identified by index=228, i.e., the bit pattern for the index=228 is stored in the "Right" field of the first allocated data memory block 10D (see FIG. 5B where set pointers are indicated by a solid line and unset pointers are indicated by a dashed line). In a similar manner, the second allocated data memory block 10D identified by the index=228 is backward linked to the first allocated data memory block 10D identified by the index=217, i.e., the bit pattern for the index=217 is stored in the "Left" field of the second allocated data memory block 10D (see FIG. 5B). In the final substep of step 304, the new data is inputted to bytes twenty (20) to forty (40) of the first and second allocated data memory blocks 10D (indexes=217, 228) and the old data from bytes sixteen (16) through nineteen (19) of the second data memory block 10D (index=222) and bytes forty-one (41) through forty-seven (47) from the third data memory block 10D (index=223) is copied into the corresponding bytes of the first and second allocated memory blocks 10D (indexes=217 and 228, respectively). See FIG. 5B wherein new data is identified with an "N" and copied data is identified with an "L" (for legacy).

Next, in step 306 the anti-tearing algorithm is operative to: (1) set the backward pointer of the first allocated data memory block 10D (index=217) to point to the first data memory block 10D (index=221) of the root file 220'; and (2) set the forward pointer of the second allocated data memory block 10D (index=228) to point to the last data memory block 10D (index=224) of the root file 220'. That is, the bit pattern for the index=221 is stored in the "Left" field of the header segment of first allocated data memory block 10D (index=217) and the bit pattern for the index=224 is stored in the "Right" field of the header segment of the second allocated data memory block 10 (index=228), respectively (see FIG. 5C wherein set pointers are indicated by a solid line and unset pointers are indicated by a dashed line).

In step 308 the anti-tearing algorithm is operative to set the RD and WIP bits for the root file 220 ' to one (1) in an atomic write operation to reflect that the backward pointers are to be used to read root file 220' (RD=1) and that a 'write' operation is being conducted with respect to root file 220' (WIP=1). It will be appreciated that any two bits of any single byte in the data segment 14/data field 32 of the header memory block 10H (index=220') may be allocated for the purpose of storing the status bits RD and WIP.

The anti-tearing algorithm is then operative in step 310 to set the forward pointer of the first data memory block 10D (index=221) to point to the first allocated data memory block 10D (index=217). That is, the bit pattern for the index=217 is set in the "Right" field of the header segment of the first data memory block 10D (index=221). See FIG. 5E where solid lines indicate set pointers and the dashed line indicates the single remaining unset pointer.

In step 312 the anti-tearing algorithm is operative to clear the RD status bit, i.e., RD status bit equals zero (0). This indicates that the forward pointers are to be used in reading the root file 220' (RD=0), but that a write operation is still in progress with respect no to root file 220' (WIP=1).

In step 314 the anti-tearing algorithm is operative to set the backward pointer ("Left" field) of the last data memory block 10D (index=224) of the root file 220' to point to the second allocated memory block 10D (index=228). That is, the bit pattern for the index=228 is set in the "Left" field of the header segment of the last data memory block 10D (index=224).

Finally, in step 316, the anti-tearing algorithm executes the first set of instructions to clear the WIP status bit, i.e., the WIP equals zero (0), in an atomic write operation. This indicates that there is no longer a write operation in progress on root file 220', i.e., that the write operation is complete.

Table IV illustrates the double-linking of memory blocks 10 of the root file 220' depicted in FIG. 5F, i.e., after a write operation implemented via the first set of instructions of the anti-tearing algorithm of the present invention as described in the preceding paragraphs.

TABLE IV

DOUBLE LINK STRUCTURE AFTER DATA CONSISTENCY UPDATE

| MEMORY BLOCK | FORWARD LINK | Backward Link |
| --- | --- | --- |
| 220' | 221 | 224 |
| 221 | 217 | 220' |
| 217 | 228 | 221 |
| 228 | 224 | 217 |
| 224 | 220' | 228 |

7. ANTI-TEARING ALGORITHM—DETECT AND RECOVER FROM TEARING OPERATION

Figure 7:
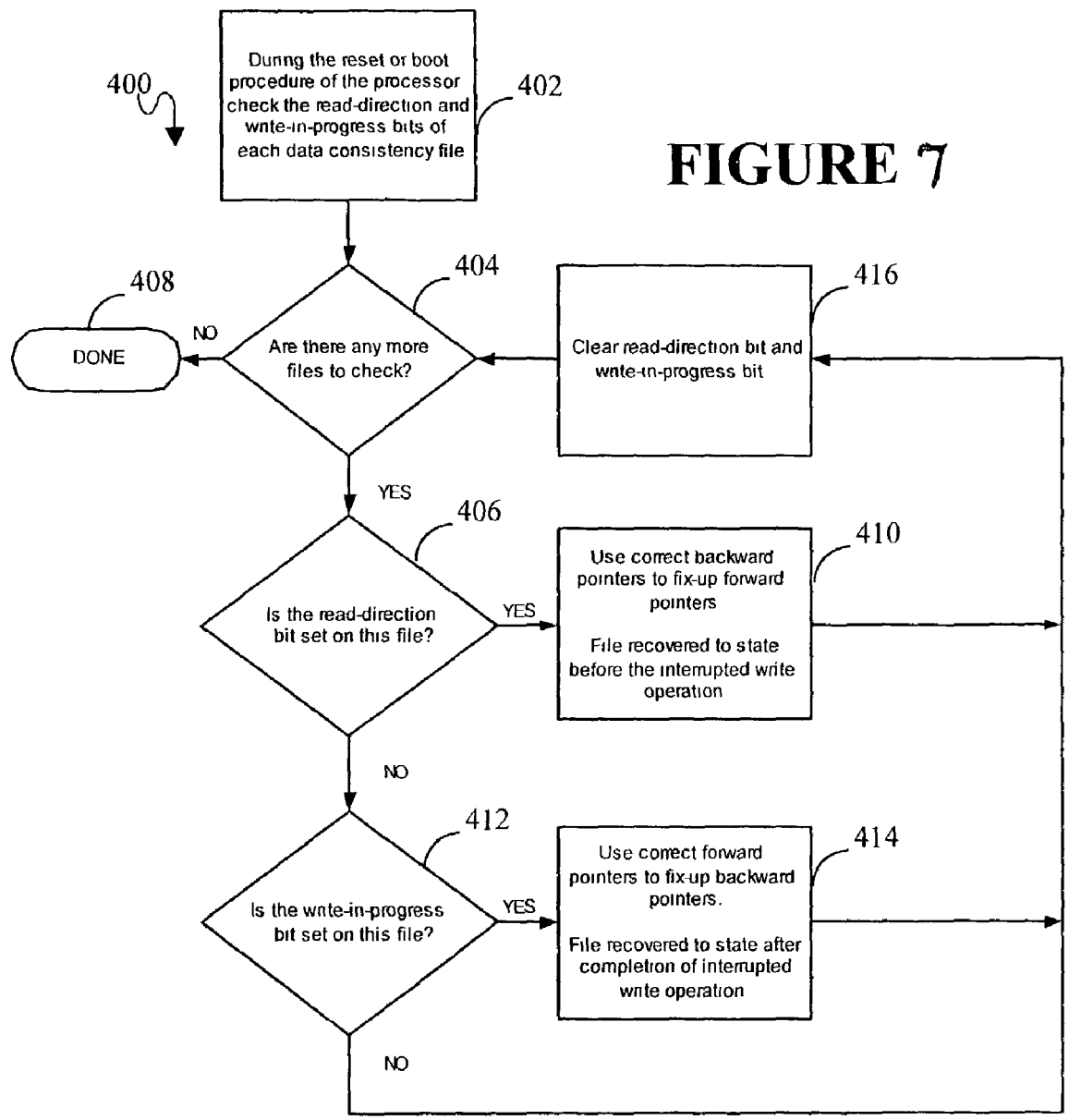
FIG. 7 is a flowchart depicting a detect and recovery operation effected by the second set a instructions of the anti-tearing algorithm of the present invention with respect to all data-protected files of the hierarchical file system according to the present invention upon power up, reinitialization, or reset of a limited-resource computer system such as a smart card.

The anti-tearing algorithm is operative to implement its second set of instructions in the event of tearing to perform a detect and recover operation with respect to all data-protected files of the hierarchical file system according to the present invention as exemplarily illustrated in FIG. 7 (second set of instructions identified as the method 400). When a limited-resource computer system 110 such as a smart card is powered up, reinitialized, or reset, as part of the "boot" or initialization procedures of the operating system, the second set of instructions executed by the anti-tearing algorithm causes the RD and WIP status bits of a first data-protected file to be checked in step 402. If either or both of the RD and/or WIP status bits are set, i.e., equal to one (1), a write operation was interrupted, i.e., not executed, and the following recovery procedure is executed before the operating system and the hierarchical file system according to the present invention are declared ready for use by applications such as those illustrated in FIG. 1 by reference numerals 140, 150, and/or 160.

If the anti-tearing algorithm determines that the RD status bit is set, i.e., equal to one (1), in step 406, then the validity of the forward pointer of a memory block M−1 (e.g., the first data memory block 10D (index=221) in the example described above) may be indefinite, i.e., incorrrect, but the backward pointers represent the correct state of the data-protected file before the write operation began. Therefore, the anti-tearing algorithm implements the second set of instructions to use the backward pointers to set the forward pointers in step 410, and in particular, to set the forward pointer of block M−1 to a valid state, i.e., the state of the data-protected file before the write operation began.

For example, if tearing occurred during step 310 described above, the two-byte forward pointer of memory block 221, i.e., block M−1, of the root file 220' could be set such that the first byte was equal to the first byte of the index of the first allocated memory block 217 while the second byte was equal to the second byte of the index of the current memory block 222, which is an inconsistency in the structure of the file. The anti-tearing algorithm is operative in this circumstance to use the correct backward pointer of memory block 222, which points to memory block 221, to reset the forward pointer of memory block 221, i.e., block M−1, to point to memory block 222 so that the data-protected root file 220' is in the state it was in before the write operation began (i.e., before step 310 was implemented).

After the forward pointers are set in step 410, the RD and WIP status bits are cleared, i.e., changed to zero (0), in step 416.

If the anti-tearing algorithm determines that the RD status bit is cleared, i.e., equal to zero (0), but the WIP status bit is set, i.e., equal to one (1), in step 412, then the backward pointer of memory block N+1 (e.g., the last data memory block 10D (index=224) in the example described above) may be indefinite, i.e., incorrrect, but the forward pointers represent the correct state of the data-protected file after the write operation is fully executed. Therefore, the anti-tearing algorithm implements the second set of instructions to use the forward pointers to set the backward pointers in step 414, and in particular, to set the forward point of block N+1 to a valid state, i.e., the state of the data-protected file after the write operation was fully executed.

For example, if tearing occurred during execution of step 314 described above, the two-byte backward pointer of memory block 224, i.e., block N+1, of the root file 220' could be set such that the first byte was equal to the first byte of the index of the second allocated memory block 228 while the second byte was equal to the second byte of the index of the current memory block 223, which is an inconsistency in the structure of the file. The anti-tearing algorithm is operative in this circumstance to use the correct forward pointer of memory block 228, which points to memory block 224, to reset the backward pointer of memory block 224, i.e., block N+1, to point to memory block 228 so that the data-protected root file 220' is in the state it will be in after the write operation was fully executed (i.e., after steps 314 and 316 are completed).

After the backward pointers are set in step 414, the RD and WIP status bits are cleared, i.e., changed to zero (0), in step 416.

After step 416, the anti-tearing algorithm continues to execute the second set of instructions to reimplement the method 400 described above until all of the data-protected files of the hierarchical file system stored in a limited-resource computer 110 such as a smart card have been checked. Once all data-protected files have been checked, the anti-tearing algorithm executes the second set of instructions implement step 408 to stop the method 400. At this point, the operating system and hierarchical file system according to the present invention are declared ready for use by applications such as those illustrated in FIG. 1 by reference numerals 140, 150, and/or 160.

The anti-tearing algorithm for the hierarchical file system of the present invention ensures that data of data-protected files of a limited-resource computer system such as a smart card is always consistent, even if the cardholder arbitrarily removes the power and clock signal therefrom. The hierarchical file system according to the present invention is characterized by limited code size and compact representations (for ease of implementation), exhibits robustness with respect (non-susceptibility) to occasional errors, and provides fast access and storage in memory-only storage environments, and thus is highly suitable for deployment in limited-resource computer systems such as smart cards.

A variety of modifications and variations of the present invention are possible in light of the above teachings. It is therefore to be understood that, within the scope of the appended claims, the present invention may be practiced other than as specifically described hereinabove.

What is claimed is:

1. A hierarchical file system of computer-readable data objects, the hierarchical file system operable within a limited-resource computer system to enable an anti-tearing function, the hierarchical file system comprising:

at least one computer-readable directory operable within a memory element of the limited-resource computer system, said at least one computer-readable directory having an index that uniquely identifies said at least one computer-readable directory;

one or more files in said at least one computer-readable directory, each of said one or more files having an index that uniquely identifies said file;

wherein said at least one computer-readable directory and said one or more files in combination define a double-linked set of objects; and wherein each object of said double-linked set of objects is forward linked to another object of said double-linked set of objects;

each said object of said double-linked set of objects is backward linked to another object of said double-linked set of objects; and wherein ones of said objects have associated therewith a read-direction status bit indicating whether a read direction is forward or backward, and a write-in-progress status bit indicating whether a write operation is in progress with respect to said file, the read-direction status bit and write-in-progress status bit each having a physical, digital electronic state, the physical, digital electronic state being representative of whether or not said write operation was interrupted before it was completed, such that the physical, digital electronic state is readable by the file system to enable said anti-tearing function.

2. The hierarchical file system of claim 1 wherein said one or more files comprise at least two files such that one of said files is defined as a first file in the double-linked set of objects and another of said files is defined as a last file in the double-linked set of objects; and wherein
said at least one computer-readable directory is forward linked to said first file, and
said at least one computer-readable directory is backward linked to said last file.

3. The hierarchical file system of claim 2 wherein
said first file is backward linked to said at least one computer-readable directory file;
said first file is forward linked to a next file in the double-linked set of objects;
said last file is forward linked to said at least one computer-readable directory file; and
said last file is backward linked to a previous file in the double-linked set of objects.

4. The hierarchical file system of claim 3 wherein
said next file is said last file such that said first file is forward linked to said last file; and
said previous file is said first file such that last file is backward linked to said first file.

5. The hierarchical file system of claim 1 wherein said at least one computer-readable directory comprises a header memory block identified by said index identifying said at least one directory, said header memory block having
a header segment including
an "Up" field that identifies the last object of said double-linked set of objects, and
a "Down" field that identifies the first object of said double-linked set of objects.

6. The hierarchical file system of claim 5 wherein said header segment further includes
a "Left" field containing said index identifying said header memory block; and
a "Right" field containing said index identifying said header memory block.

7. The hierarchical file system of claim 5 wherein said header segment includes a "Type" field that identifies said at least one computer-readable directory as directory.

8. The hierarchical file system of claim 5 wherein said header segment includes a "Name" field that identifies the name of said at least one computer-readable directory.

9. The hierarchical file system of claim 5 wherein said header memory block of said at least one computer-readable directory further includes a data segment that does not contain data.

10. The hierarchical file system of claim 1 wherein each of said files of said at least one directory includes a header memory block identified by said index of said file, each said header memory block including
a "Right" field that forward links said file to the next object in said double-linked set of objects; and
a "Left" field that backward links said file to the previous object in said double-linked set of objects.

11. The hierarchical file system of claim 10 wherein at least one of said files further includes at least one data memory block uniquely identified by an index, and wherein such that each header memory block of each said file includes
an "Up" field that points to a last data memory block of said file; and
a "Down" field that points to a first data memory block of said file.

12. The hierarchical file system of claim 11 wherein each said data memory block of each said file includes
a "Left" field that identifies a previous memory block of said file; and
a "Right" field that identifies a next memory block of said file.

13. The hierarchical file system of claim 12 wherein each said data memory block of each said file includes
an "Up" field that is zero; and
a "Down" field that is zero.

14. The hierarchical file system of claim 1 wherein said at least one computer-readable directory comprises a first directory and a second directory, each said first and second directories having an index that uniquely identifies said directories, and wherein said one or more files comprise a plurality of files wherein some of said plurality of files are part of said first directory and the remainder of said plurality of files are part of said second directory; and wherein
said first directory and its files in combination define a first double-linked set of objects; and
said second directory and its files in combination define a second double-linked set of objects.

15. The hierarchical file system of claim 1 wherein said at least one computer-readable directory comprises a header memory block identified by said index identifying said at least one directory, said header memory block including
an "Up" field that identifies the last object of said double-linked set of objects, and
a "Down" field that identifies the first object of said double-linked set of objects;
and wherein each of said files includes a header memory block, said header memory block including
a "Right" field that forward links said file to the next object in said double-linked set of objects, and
a "Left" field that forward links said file to the previous object in said double-linked set of objects.

16. The hierarchical file system of claim 15 wherein at least one of said files further includes at least one data memory block and wherein each said header memory block of each said file further includes
an "Up" field that points to the last data memory block of said file, and
a "Down" field that point points to the first data memory block of said file; and
wherein each said data memory block of each said file includes
a "Left" field that identifies a previous memory block of said file, and
a "Right" field that identifies a next memory block of said file.

17. A hierarchical file system operable within a limited-resource computer, to enable an anti-tearing function, the hierarchical file system comprising:
a computer-readable directory operable within a memory element of said limited-resource computer system, said directory having an index that uniquely identifies said directory; and
a file having an index that uniquely identifies said file;
said directory and said file in combination defining a double-linked set of objects;
said directory comprising a header memory block that includes an "Up" field that identifies said file as the last object of said double-linked set of objects;

said file having a header memory block that includes a "Left" field that backward links said file to said header memory block of said directory; and wherein ones of said objects have associated therewith a read-direction status bit indicating whether a read direction is forward or backward, and a write-in-progress status bit indicating whether a write operation is in progress, the read-direction status bit and write-in-progress status bit each having a physical, digital electronic state, the physical, digital electronic state being representative of whether or not said write operation was interrupted before was completed, the physical, digital electronic state being readable by the file system to enable anti-tearing function.

18. A computer-readable file structure of a hierarchical file system of computer-readable data objects, the computer-readable file structure operable within a memory element of a limited-resource computer system to enable an anti-tearing function the computer-readable file structure comprising:

a header memory block adapted for operations in said limited-resource computer system, said header memory block uniquely identified by an index, said header memory block including a header segment and a data segment, said header segment including a "Left" field that points to the next object in the hierarchical file system; and a "Right" field that points to a previous object in the hierarchical file system, thereby to define a double-linked set of objects;

each objects of said double-linked set of objects is forward or backward linked to another object of said double-linked set of objects;

wherein ones of said objects have associated therewith said data segment; and wherein said data segment includes status bits, said status bits including a read direction status bit indicating whether a read direction is forward or backward, and a write-in-progress status bit indicating whether a write operation is in progress with respect to a given file within the computer-readable file structure, the read-direction status bit and write-in-progress status bit each having a physical, digital electronic state, the physical, digital electronic state being representative of whether or not a write operation was interrupted before it was completed, the physical, digital electronic state being readable by the file system to enable said anti-tearing function.

19. The computer-readable file structure of claim 18 wherein said data segment contains data of said file.

20. The computer-readable file structure of claim 18 wherein said data segment does not contain data for said file, indicating that said file is a data-protected file.

21. The computer-readable file structure of claim 18 further comprising at least one data memory block uniquely identified by an index, and wherein said header memory block further includes an "Up" field that points to the last data memory block of said file; and a "Down" field that points to the first data memory block of said file.

22. The computer-readable file structure of claim 21 wherein said at least one data memory block includes a header segment and a data segment, and wherein said header segment of each said data memory block includes a "Left" field that identifies a previous memory block of said file; and a "Right" field that identifies a next memory block of said file.

23. The computer-readable file structure of claim 22 wherein said header segment of each said data memory block further includes: an "Up" field having an index equal to zero; and a "Down" field having an index equal to zero.

24. The computer-readable file structure of claim 18 further comprising at least two data memory blocks each uniquely identified by an index, and wherein each said data memory block includes a header segment and a data segment, said header segment of each said data memory block including:

a "Right" field that points to the next memory block of said file;

a "Left" field that points to the previous memory block of said file; an "Up" field having an index equal to zero; and a "Down" field having an index equal to zero; and wherein said header memory block further includes an "Up" field that points to the last data memory block of said file; and a "Down" field that points to the first data memory block of said file.

* * * * *